Feb. 11, 1941. G. J. BLUM 2,231,433
POWER SAW
Filed March 11, 1936 3 Sheets-Sheet 2

Inventor;
George J. Blum.
BY
Parker, Carlson, Pitzner & Hubbard
Attorneys.

Patented Feb. 11, 1941

2,231,433

UNITED STATES PATENT OFFICE 2,231,433

POWER SAW

George J. Blum, Chicago, Ill., assignor to Armstrong-Blum Mfg. Co., Chicago, Ill., a corporation of Illinois Application March 11, 1936, Serial No. 68,187

37 Claims. (Cl. 29—73)

This invention relates to saws and more particularly concerns improvements in power driven hack saws.

A principal object of the invention resides in the provision of a power saw capable of more rapid and economical operation without an increase in driving speed and characterized by its more uniform distribution of cutting force and its improved manner of operation by which the cutting capacity of the saw blade is substantially increased while the length of the cutting stroke is reduced.

Another object is to provide a power hack saw of improved construction and increased efficiency embodying means for imparting to the saw blade a cutting motion which is unique in power saws.

More specifically stated, it is an object of the invention to provide a power driven hack saw in which relative movement is produced between the work support and the saw blade during the cutting stroke so as to carry successive portions of the cutting edge of the saw blade into and out of cutting relation with successive portions of the work progressively.

Another object is to provide an improved power hack saw of the foregoing character wherein coolant fluid is directed from a position unvaryingly related to the path of movement of the cutting edge of the saw blade and is operable to flush the cut in the work continuously clear of chips as the successive portions of the blade become progressively inactive.

Another object resides in the provision of a power saw in which a rolling motion is imparted to the blade, by reciprocating the saw frame in a stroke path which angularly intersects the normal longitudinal axis of the saw blade, and varying the pitch of the intersecting path progressively during the cutting stroke.

Another object is to provide an improved power hack saw construction in which the cutting force is applied in a balanced and uniform manner along the longitudinal center line of the cutting edge of the saw blade and in greater force than heretofore practicable without distortion, buckling or unusual wear on the blade.

Another object is to provide improved means in a power saw for guiding the saw frame in the cutting stroke path.

Another object resides in the provision of the improved construction and novel relationship of parts by which the foregoing and ancillary objects and advantages of the invention are carried into practice.

The objects of the invention thus generally stated together with other and ancillary advantages, are obtained by the construction and arrangement illustrated in the accompanying drawings, in which.

While the invention is susceptible of various modifications and alternative constructions, I have shown in the drawings and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

By way of illustration, the invention is shown as embodied in a practical power hack saw organization including a movable carriage which comprises an elongated housing 10 enclosing a substantially U-shaped saw frame having a yoke 11 and front and rear legs, 12 and 13 respectively, straddling an opening 10ª in the lower part of the housing and carrying therebetween under suitable tension a saw blade 14. Opposite ends of the housing may be provided with coaxially bored, vertically spaced guides 15 and 16 which slidably engage spaced vertical posts 17. At their lower ends the posts are fixedly secured to similar segmental base members 18 movably supported upon a bed 19 which provides arcuate T-shaped guide slots 20 underlying the base members for receiving appropriate locking bolts 21. The radii of the slots are so correlated that by passing a suitable rod through coaxially bored bosses 22, conveniently formed on one side of the opposite lower housing guides 15, the entire carriage may be shifted about a vertical axis for varying the angle at which the saw blade 14 will cut a work piece 23, any position so determined being fixedly maintained by tightening the lock bolts. Means including the usual opposed, adjustable clamping jaws 24 may be supported by the bed 19 for holding the work piece in position to be sawed. Coolant may be supplied to the work from suitable adjustable jet producing means 25 carried by the housing 10 on opposite sides of the opening 10$^a$.

In order to effect a sawing relation between the blade and the work piece, means is provided for imparting relative approaching or retracting movement thereto. A practical means for this purpose may comprise a hydraulic system including a pair of ram domes 26 secured coaxially over the outer ends of the upper housing guides 16 so as to receive in a slidable and substantially fluid tight manner the upper ends of the posts 17. By admitting pressure fluid to the domes 26 through conduits 27, the domes and thereby the housing will be moved up on the posts and carry the saw frame and blade into a desired vertical position above the work piece. Fluid pressure is developed by a pump 28 (Figs. 1 and 7) in communication with the conduits 27 and suitably mounted upon a platform 29 on the upper part of the housing 10. A supply of pressure fluid, such as oil, may be contained in a reservoir 28$^a$ located at any convenient place on the housing 10 and having the pump 28 in suitable communication therewith. The pump may be of any suitable positive type, and may be driven by a sprocket chain 30 engaging a driving sprocket 32 rotatably mounted on a driven shaft 33. A bearing bracket 34 (Fig. 2) fixed upon the platform 29 carries the shaft in a transverse position relative to the housing, and one end of the shaft may have fixedly secured thereto a driving sheave 35. Power for driving the sheave and shaft is transmitted through driving belts 37 from a suitable prime mover, preferably an electric motor 38, also mounted on the upper part of the housing and controlled by a switch 39 mounted in a convenient position on the housing.

The motor may be permitted to drive the shaft 33 continuously while the apparatus is in use, but the pump 28 need be actuated only when pressure fluid is forced into the domes 26 for raising the carriage. For this reason a clutch assembly 40 may be placed in control of the pump driving sprocket 32, a clutch yoke 42 for throwing the clutch into or out of engagement being carried by a pivotally mounted arm 43. Operative movement is imparted to the arm 43 by a manual control lever 44 suitably mounted on one end of the housing 10 and having an appropriate articulate connection with the clutch yoke arm through suitable vertical and horizontal links 45 and 47 connected by a pivoted bell crank lever 46. Thus, to effect elevation movement of the housing 10, the operator need only move the control lever 44 upwardly, for example, which will throw in the clutch 40 and operate the pump until the handle is released.

Downward movement of the saw frame carriage to carry the saw into engagement with the work is caused by discharge of pressure fluid from the domes 26, the limit of descent being reached when the lower ends of the housing guides 15 contact the upper faces of the segmental bases 18. Fluid discharge may be appropriately controlled for effecting rapid traverse downwardly to bring the saw into cutting position relative to the work and also for governing the rate of descent and the pressure to be exerted by the saw upon the work for any condition of operation. Means for this purpose may comprise a by-pass valve 27$^a$ (Fig. 7) adapted to be manually operated in any preferred manner as by pushing the control lever 44 downwardly, and a governor, indicated generally by the numeral 49, adjustable through a regulating link 50 to fix the rate at which the carriage is allowed to descend and a regulating link 52 to control the pressure with which the carriage will be allowed to carry the saw against the work. This governor 49 may operate on the principle of discharging the pressure fluid from the domes 26 by controlled increments to drop the saw carriage 10 during the cutting strokes of the saw and halting the discharge and thereby descent of the carriage during the return strokes of the saw. With this end in view the governor comprises a body 49$^a$ (Figs. 7 and 8) having therein a pressure fluid passage 27$^b$ which communicates at one end with a vertical pressure fluid chamber 49$^b$ in the body and is connected at the other end with a pressure duct 27$^c$ leading from the pressure fluid lines 27. Pressure fluid may bleed through the passage 27$^b$ past a check valve 27$^d$ which is mounted under spring tension that may be varied by suitable eccentric adjusting mechanism 27$^e$ operated by a lever 52$^a$ that is connected to the adjusting link 52. Thus, the adjustment of the bleeding valve 27$^d$ will govern the rate at which the saw carriage will descend and thereby the pressure with which the saw blade 14 will bear against the work during the cutting stroke.

The pressure fluid which has been bled into the chamber 49$^b$ can escape therefrom only through an exhaust passage 49$^c$ which includes a control valve 49$^d$ and communicates with a return duct 49$^e$ discharging into the reservoir 28$^a$. The control valve 49$^d$ is normally held to its seat by means of a spring 49' with a pressure at least as great as the maximum fluid pressure in the hydraulic domes 26. Through this arrangement, when the chamber 49$^b$ becomes filled with the pressure fluid that is bled past the valve 27$^a$, descent of the carriage 10 will be halted.

Then, to condition the governor for further bleeding off of pressure fluid, the fluid accumulated in the chamber 49$^b$ is discharged by increasing the pressure therein sufficient to overcome the tension of the spring 49' and open the valve 49$^d$. Suitable means for operating the governor may comprise a mechanism including a link 53 (Fig. 1) which is pivotally connected at one end to a cross head 53$^a$ (Fig. 7) slidably mounted on a pair of spaced, parallel guide pins 53$^b$ that extend rigidly from a closure plate 53$^c$ over the outer end of the pressure fluid chamber 49$^b$. Pressure fluid within the chamber 49$^b$ causes a cylindrical plunger 53$^d$ to be displaced longitudinally out of the chamber slidably through the closure plate 53$^c$ until the outer end of the plunger abuts the cross head 53$^a$. It will thus be apparent that the distance to which the plunger 53$^d$ may project out of the chamber 49$^b$ will govern the volume of pressure fluid that may bleed from the hydraulic domes 26 and thereby controls the distance to which the carriage 10 will descend during any cutting stroke.

Figure 1:
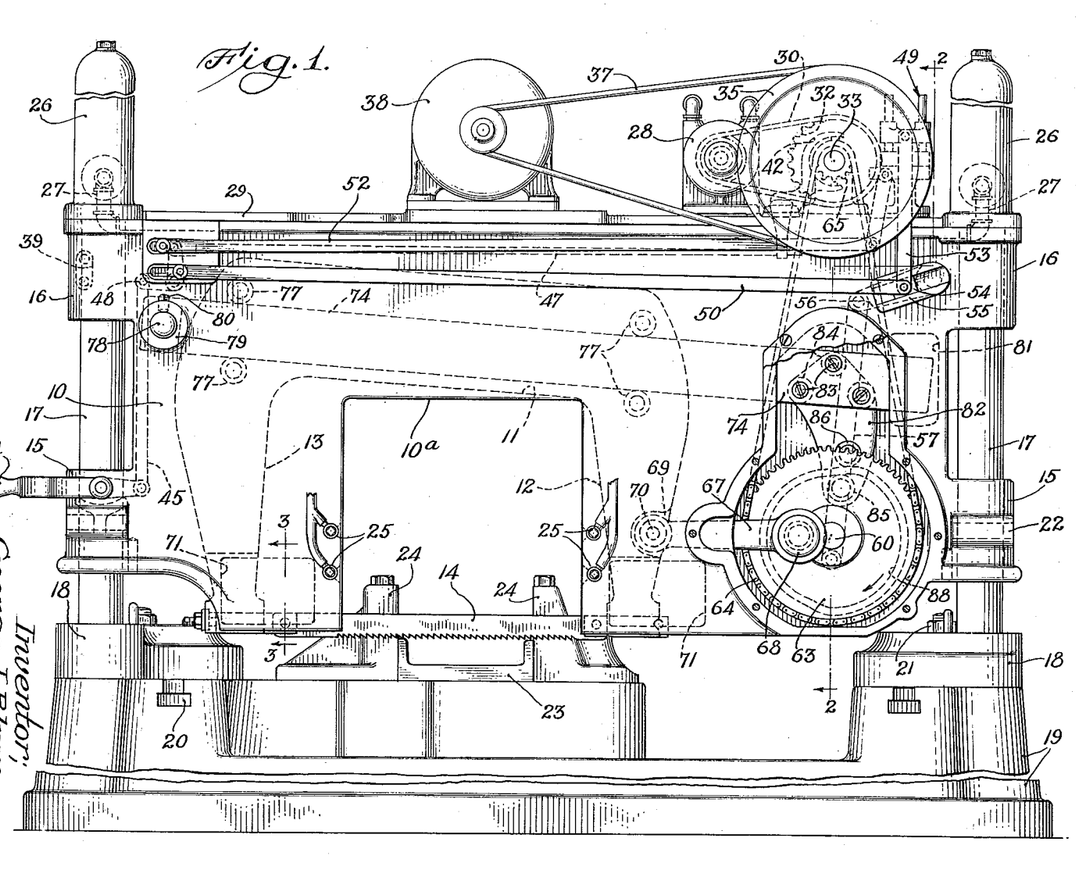
Figure 1 is an elevational view of a practical device embodying the principles of the invention.
Figures 2, 3, 6, 7, 8:
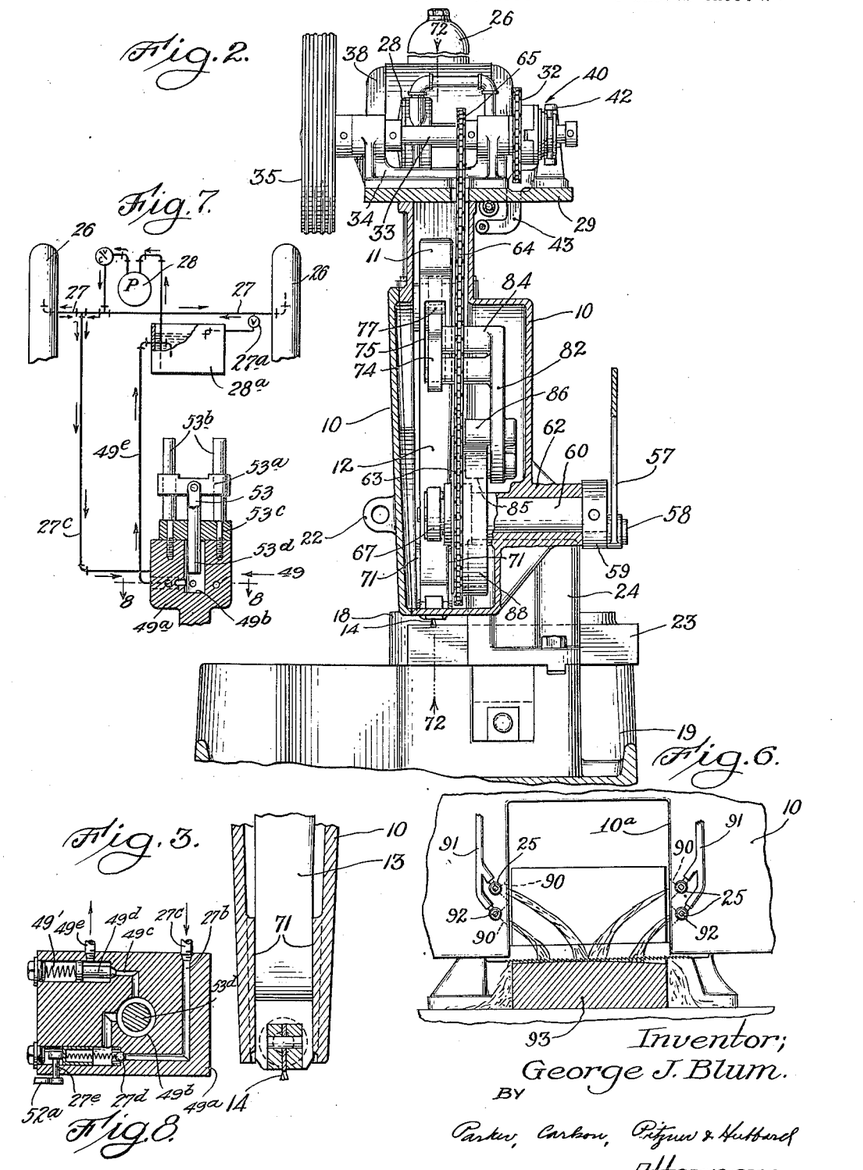
Fig. 2 is a sectional elevation taken substantially along line 2—2 of Figure 1, and with some parts omitted to avoid confusion.
Fig. 3 is a fragmentary sectional view taken substantially along line 3—3 of Figure 1.
Fig. 6 is a fragmental elevational view diagrammatically illustrating the manner in which coolant is supplied to flush chips from the work.
Fig. 7 is a schematic view showing a carriage-elevating hydraulic system and governor means therefor, the latter being shown in vertical section.
Fig. 8 is an enlarged sectional plan view taken in substantially the plane of line 8—8 of Fig. 7.

By shifting the cross head 53$^a$ to force the plunger 53$^d$ back into the chamber 49$^b$, sufficient pressure will be exerted upon the fluid therein to exhaust the fluid past the valve 49$^d$. Such shifting of the cross head is effected by having the opposite end of the link 53 pivoted, together with the front end of the regulating link 50, on a slide 54 carried by a pivotal arm 55. A rocker arm 56 for moving the arm 55 may be connected for movement by a connecting link 57 (Figs. 1 and 2). Reciprocal movement may be imparted to the latter by an eccentric journal 58 (Fig. 2) carried by a collar 59 secured upon the outer end of a rotary shaft 60. This shaft is journaled in a bearing 62 which may be formed integrally with one side of the housing 10, and the opposite end of the shaft extends to the interior of the housing and has a driving sprocket 63 fixedly secured thereto. Power for rotating the sprocket 63 and the shaft may be transmitted through a sprocket chain 64 engaging over a driver sprocket 65 fast upon the driven shaft 33. In the reciprocation of the connecting link 57 the arm 55 will be rocked to reciprocate the link 53 which will thereby alternately raise the cross head 53$^a$ to permit pressure displacement of the plunger 53$^d$ and then pull the cross head against the plunger to retract it and thereby force pressure fluid from the chamber. Thus, the carriage 10 will alternately descend and dwell in timed sequence.

By adjusting the link 50 to move the slide 54 toward or away from the pivot of the arm 55, the reciprocal stroke of the link 53 will be varied whereby to regulate the travel of the cross head 53$^a$ and control the stroke of the plunger 53$^d$. As a result, accurate control is had over the distance to which the carriage 10 will drop or feed toward the work with each reciprocation of the cross head 53$^a$ in concert with rotation of the shaft 60 of the actuating mechanism.

The hydraulic system and governor organization thus briefly outlined form per se no part of the present invention, it being understood that any suitable mechanism may be employed for moving the housing 10 toward and from the work.

Longitudinal reciprocal movement is imparted to the saw frame by force applied directly along the vertical median plane through the saw blade by a pitman 67 having one end pivotally mounted on an eccentric hub 68 preferably cast integral with the driven sprocket 63. The opposite end of the pitman may extend into a suitable recess 69 provided in the forward leg 12 of the saw frame, and is maintained in pivotal connection with the saw frame by a pin 70. Through this arrangement distorting force or strain upon the saw frame is avoided because the operating force is applied wholly along the line of reciprocation. It will be apparent, moreover, that through this arrangement the saw frame may be reciprocated continuously while the motor 38 is in operation to drive the shaft 33, and the speed of this reciprocal movement, as well as the lowering movement of the carriage during a sawing cycle, may be gauged accurately by the relative sizes of the sprockets 63 and 65, and the speed at which the shaft 33 is driven.

A further improvement imparting particular advantage to the present invention, resides in the novel manner in which the saw frame is mounted within the housing 10 for smooth and accurate guidance and uniform cutting pressure. To this end the saw frame is preferably flattened and the side walls of the housing may be disposed relatively close together with just sufficient space therebetween to permit free movement of the saw frame. On each side of the opening 10a the housing may be provided interiorly near its lower side with opposed flat pads or bearings 71 (Figs. 1, 2, and 3) which are smoothly finished and slidably engage therebetween the ends of the saw frame legs 12 and 13. Distortion or vibration of the saw frame legs and the blade is thus avoided and great pressure may safely be imposed upon the saw frame when the saw blade is in engagement with the work piece. The present arrangement is such, moreover, that all parts of the carriage are disposed in balanced relationship with respect to the center of weight, which falls on a center line coincident with the median plane through the saw blade and the axes of the guide posts 17 as indicated generally by the line 72—72 in Fig. 2. Thus, all, or a substantial portion, of the weight of the carriage may be imposed upon the saw blade without causing uneven strain or buckling.

Cutting pressures substantially greater than heretofore practicable, while using similar saw blades for similar work, may be applied by the present invention without as much wear upon the blade as normally occurs in prior devices. This end is attained by effecting relative movement between the saw support and the work support to carry successive portions along the cutting edge of the blade into and out of engagement with successive portions of the work progressively during the cutting stroke. Herein, the saw frame is guided in a reciprocal stroke path which angularly intersects the normal horizontal stroke path of the blade, and the pitch of this angular stroke path is varied progressively during the cutting stroke. Only limited portions of the cutting edge of the saw blade are then progressively active, but the cut is completed entirely across the work. This action may aptly be termed a "roll stroke." Suitable means for effecting the roll stroke may include a bar or rail 74 extending through the longitudinal center of the saw frame yoke 11. The latter is provided for this purpose with a suitable passage 75 (Fig. 2) and opposed frictionless bearings 77 within the passage engaging the upper and lower edges of the rail. The rail is inclined from the horizontal and serves to guide the saw frame in a stroke path which intersects the axis of the substantially horizontal saw blade at an acute angle as the frame is reciprocated by the pitman 67.

Herein the front leg of the saw frame is moved downwardly relative to the work at the beginning of the cutting stroke in order to carry only a small portion of the cutting edge near the front end of the saw blade into engagement with the work piece. Incident to forward movement along the decline of the guide rail 74, the saw frame is rocked to cause the cutting edge of the saw blade to move over the work with a rolling motion. This action may be effected in practical manner by varying the pitch of the stroke path defined by the guide rail. A variation in pitch of about 3 or 4 degrees has been found suitable in practice. For this purpose one end of the rail is carried on a fixed pivot 78 mounted in the walls of the saw frame housing 10, an accurate spaced relation of the rail and the walls being maintained by a pair of collars 79 fastened to the pivot by suitable means such as set screws 80. The other or forward end of the rail may be engaged slidably between opposed vertical flat pads or bearings 81 provided near the forward end of the housing 10 (Fig. 1). These bearings, together with the collars 79, will prevent twisting or lateral movement of the rail. Means for supporting the forward end of the rail for vertical movement about the fulcrum provided by the pivot 78 may comprise an arm 82 secured fast to the rail by suitable means such as screws 83 passing through the rail and engaging laterally projecting lugs 84 on the arm.

The arm 82 in the present instance projects downwardly toward the shaft 60 and carries follower means comprising a pair of rotatable pintles 85 and 86 engaging the inside and outside faces, respectively, of a barrel cam 88. Conveniently, the cam may be cast integral with the sprocket 63 opposite the pitman hub 68. This integral construction of the sprocket, pitman hub and cam is advantageous in that it materially reduces the number of separate necessary parts in the hack saw organization. Moreover, the fixed correlation of the hub and cam greatly simplifies the application of driving force to operate the mechanism because a driving connection which is common to both the hub and cam, herein the chain 64, serves all requirements. This relationship also insures that the various parts will operate in proper timed relation.

The contours of the cam 88 are so related to the axis of the hub 68 that the movable end of the guide rail is carried sharply downwardly at the beginning of the cutting stroke and then gradually upwardly as the stroke progresses. This action may be understood from Fig. 4 in which the position of the saw frame and actuating mechanism as poised for operation is shown in full line and several representative positions during operation are shown in broken outline. It will be seen, then, that the poised position finds the axis of the pitman hub 68 at dead center, and the guide rail is in such position that the saw blade is held entirely out of contact with the work piece.

Figures 4, 5:
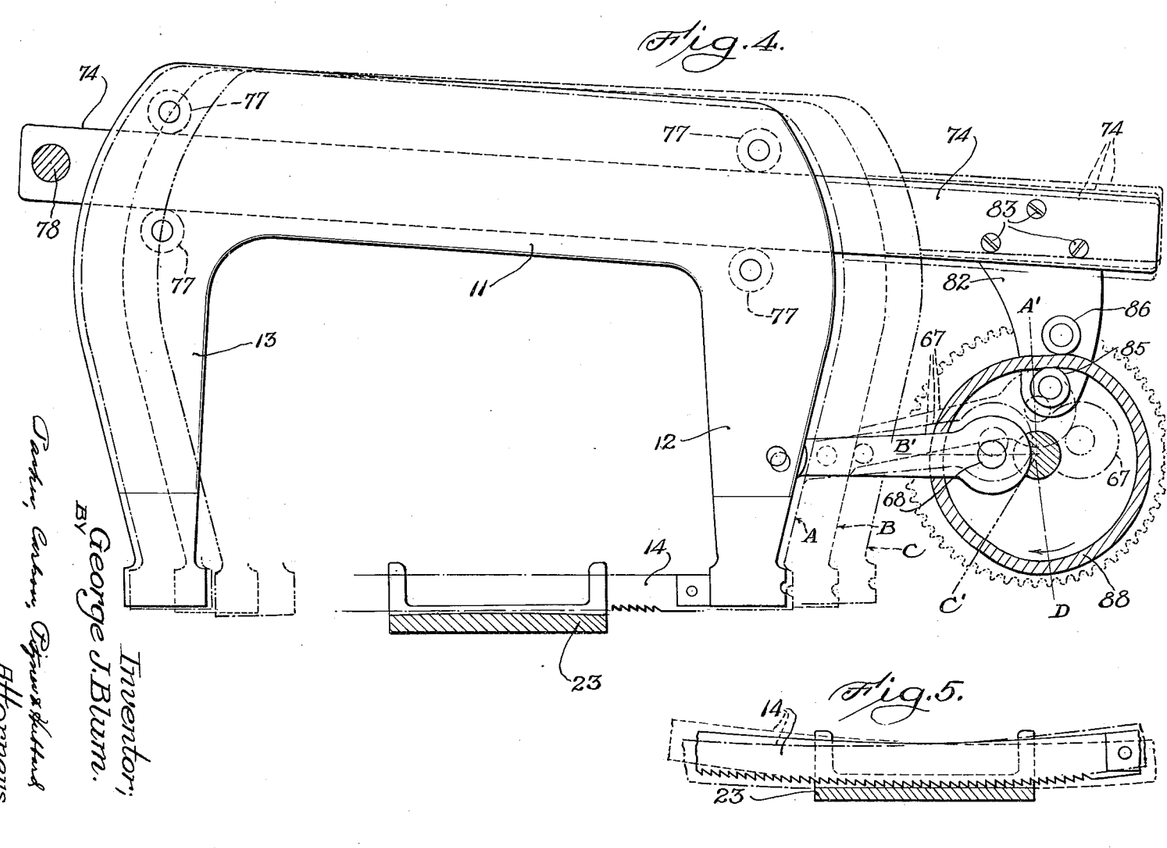
Fig. 4 is a diagrammatic view showing various positions of the saw frame during operation.
Fig. 5 is a fragmentary sectional diagrammatic view showing a slightly modified form.

As the sprocket 63 is rotated and the hub 68 is carried from the dead center position, the saw frame is moved to the position A. At the same time the follower pintles ride into a relatively sharp dip in the cam into a position A'. The end of the guide rail therefore moves downwardly and drops the forward leg 12 of the saw frame below the end of the rear leg 13. The radius of the cam increases progressively from the position A' and as the saw frame continues to move forwardly it smoothly and gradually attains the successive positions B and C wherein the follower will have reached the positions B' and C', respectively, on the cam. In the position C, the end of the forward saw frame leg 12 will be above the end of the rear leg 13; and the saw blade 14 will have remained in continuous engagement with the work, though only small successive portions of its cutting edge are in cutting engagement with small successive portions of the work progressively during the cutting stroke. In practice the vertical differences between the lower end of the forward saw frame leg 12 in positions A and C may amount to about ⅛ inch, when using a twenty-four inch blade.

Immediately following the position C', the radius of the cam 88 is relatively sharply increased so that when the followers 85 and 86 reach the position D the guide rail and the saw frame will be raised so that the blade will be held out of contact with the work during the return movement of the frame. Where the cutting edge is substantially longitudinally straight the cut surface will be on a slightly convex radius as may be seen in Figs. 4 and 6. A straight cut may be had, however, by imparting a slight convex curvature to the cutting edge of the blade, as shown in Fig. 5.

As has already been described, but a small number of cutting teeth of the saw blade in the present machine are in actual cutting engagement with the work at any time during the cutting stroke. The cutting action, moreover, progresses from the front toward the rear of the cut, so that the chips formed may fall free of the cutting teeth so as to be flushed from the cut and will not be engaged by succeeding teeth. The chips will, in fact, be found to be practically uniform and unbroken, steel chips, for example, appearing as practically identical small curls of metal. As the chips are released, they are flushed from the cut by coolant fluid supplied by the jets 25. In Figs. 1 and 6 it will be seen that the jets, herein four in number, are arranged at the sides of the opening 10ª adjacent to and in fixed positions relative to the reciprocal cutting path of the blade.

Preferably, the jets 25 are mounted in the walls of housing 10 which may be provided with outwardly flaring recesses 90 providing unobstructed passage for the streams of fluid from the jets; and a continuous supply of coolant fluid may be delivered to the jets through ducts 91 which communicate with a pump (not shown). In order to direct the streams of fluid most efficiently to work pieces of different widths, the jets 25 may be adjustable, in the present instance by turning the same on axes transversely of the opening 10ª. For this purpose, each jet may be provided with suitable means such as a head 92 engageable by means of a wrench.

With the coolant jets arranged in the manner described, the streams of coolant will as effectually flush the cut of a large work piece 93 after the same has been substantially severed as at the beginning of the cut. As a matter of fact, it has been found in practice that in the restricted passage of a deep cut, the fluid has a tendency to accumulate to some extent and thus develop a slight pressure head which aids in the flushing action. The chips are cleared as quickly as successive portions of the blade become progressively inactive during the cutting stroke and each successive roll stroke cutting action of the saw will be upon a clean surface. As a result, the saw teeth are not exposed to the abrasive action of accumulated chips as in prior devices, and greater cutting pressures than heretofore practicable may be applied to the blade in the present apparatus without unusual wearing effect on any part of the active cutting edge of the blade. Since the coolant is distributed by the several streams throughout the length of the cut, no part of the saw can become overheated.

From the foregoing it will be apparent that many advantages and novel results are secured by the roll stroke action of the present invention. Some of these have been touched upon but they may be summed up with others, in conclusion, as follows:

Since only successive, small portions of the cutting edge are progressively active during the cutting stroke, every part of the cutting edge is put to equal use and is subject to equal wear. No wear due to dragging the saw teeth over the cut surface will occur in the present device, and the supply of coolant keeps the saw blade cool and maintains the cut clear of chips. The life of the saw blade is therefore materially lengthened.

Ordinarily some of the saw teeth are spread or set as seen in Fig. 3, and the set determines the width of the cut made by the saw. Since the body of the blade is thinner than the width of the cut, downward pressure on the blade where all of the teeth are in contact with the cut surface may cause the blade to twist or buckle, resulting in an uneven cut. In the present invention, however, the set teeth which are out of active cutting engagement contact the walls of the cut and serve as guides to prevent distortion of the active teeth and thereby insure a perfectly uniform severance of the work piece. The teeth serving as guides, moreover, move in crisscross fashion during the various longitudinal and transverse vertical movements of the saw blade and act to smooth the walls of the cut.

Much greater cutting pressures than heretofore possible may be applied without strain, excessive wear or damage to the blade or other parts of the apparatus. Therefore, much greater cutting speed may be attained without increasing the speed of the cutting stroke. Moreover, the increase in cutting speed may be attained with a much shorter cutting stroke than heretofore. For example, a work piece such as a billet eighteen inches wide may be sawed with great rapidity with a twenty-four inch blade while using a substantially four and three-quarter inch stroke.

With the present invention materials of exceptional hardness may be severed with unusual efficiency and economy and at a speed not ordinarily attainable with sawing apparatus heretofore used for the purpose.

In addition to the aforesaid and other advantages, the invention provides simple, inexpensive, durable and highly efficient apparatus that may be operated at low cost.

I claim as my invention:

1. In combination in a power driven saw, a saw carrier and a saw blade carried thereby, means supporting said carrier and arranged to raise or lower the same relative to a work piece, means for reciprocating said carrier to move the blade through a cutting stroke, means for relatively moving the ends of the blade during the cutting stroke to impart a progressive rolling motion from the forward end to the rear end of the cutting edge of the blade to maintain only relatively small successive portions of its cutting edge in active cutting engagement with the work progressively throughout the length of the cutting stroke, and means on said carrier supporting means arranged to direct coolant fluid to the blade and the cut surface of the work to flush the latter continuously clear of chips as the successive portions of the blade become progressively inactive.

2. A saw having, in combination, a work-holder, a carriage movable rectilinearly toward the work-holder, a guide bar pivoted on said carriage to swing toward and away from the work-holder, a saw carried by and reciprocable longitudinally of said bar, and means for simultaneously swinging the bar and reciprocating the saw.

3. In combination in a power driven hack saw construction, a housing supported for vertical movement, a work support below said housing, a central opening in said housing above said work support, a U-shaped saw frame having a yoke portion above said opening and downwardly extending arms on either side of said opening, a guide track fixedly pivoted near one upper corner of said housing and extending diagonally across the interior of the housing above said opening in slidable coaction with said frame, means carried by said housing for imparting reciprocal movement to said frame longitudinally of said track, and means for rocking said track on said fixed pivot as an incident to reciprocal movement of the frame.

4. In combination in a power driven hack saw construction, a housing supported for vertical movement, a work support below said housing, a central opening in said housing above said work support, a U-shaped saw frame having a yoke portion above said opening and downwardly extending arms on either side of said opening, a guide track fixedly pivoted near one upper corner of said housing and extending diagonally across the interior of the housing above said opening in slidably coacting relation with said frame, means carried by said housing for imparting reciprocal movement to said frame longitudinally of said track, means for rocking said track on said fixed pivot as an incident to reciprocal movement of the frame, and means carried by said housing and coacting with opposite sides of said frame arms for guiding the same in a fixed path when said frame is reciprocated.

5. In a power driven hack saw construction, a housing having an elongated track member pivotally connected at one end to one end of the housing, a saw frame slidably supported by said track member, and means on said housing for reciprocating said frame on said track and for simultaneously rocking said track about said pivot.

6. In combination in a power driven hack saw, a support for carrying a piece of work to be cut, a housing mounted for vertical movement relative to said support and having an opening for receiving the work piece, a saw blade traversing said opening and having guiding means mounted within said housing, and means on said housing adjacent the path of movement of said blade and adapted to direct streams of coolant from the walls of said housing defining said opening toward the blade.

7. In combination in a power driven hack saw, a housing including a track pivotally connected at one end to the housing, a saw frame slidably supported by said track, driving means for moving said saw reciprocally along said track including a rotatable driving element having an eccentric hub and a cam on opposite sides thereof, a pitman in engagement with said hub and said saw frame to reciprocate the same during the rotary movement of said element, and means on the end of said track remote from its pivotally connected end and coacting with said cam to raise and lower the forward end of said frame during reciprocal movement thereof.

8. A power driven hack saw comprising, in combination, a work support, a carriage mounted for vertical movement and constructed to form a housing having laterally spaced side walls, said housing having a lower central opening for receiving work on said support, a U-shaped saw frame enclosed within said housing between said side walls thereof and having end portions on opposite sides of said opening and a yoke portion connecting the end portions and disposed above said opening, means in said housing for guiding the saw frame for bodily reciprocation, and means for reciprocating the frame, the lower end portions of the frame having portions slidably engaging with opposite side walls of the housing to guide the frame in its reciprocation.

9. A power driven hack saw comprising in combination, a work support, a carriage mounted for up and down movement relative to said work support, said carriage comprising a housing having a lower central opening for receiving work positioned on said support, a saw frame enclosed within said housing and supporting a saw blade transversely of said opening, means in said housing above said opening for guiding the saw blade for reciprocation, opposed bearing surfaces in said housing at each side of said opening, said frame having portions adjacent opposite ends of the blade slidably engaging with said bearing surfaces in a manner to permit gyratory movement of said frame therebetween during reciprocation of said blade, and means for reciprocating the saw frame in said housing.

10. A power driven hack saw having, in combination, a work support, a main frame mounted for movement toward and from the work support, said main frame having a lower central opening adapted to receive the work, a saw frame having end portions on opposite sides of said opening and a yoke portion connecting the end portions above the opening, said main frame being constructed to form a housing enclosing the opposite sides of said saw frame, means for slidably supporting the saw frame in the housing, a saw blade secured to the lower ends of said end portions within said housing, the latter having openings therein for the passage of said blade, and means for reciprocating the saw frame.

11. A power driven hack saw comprising, in combination, a work support, a main frame mounted for movement toward and from said work support and having a lower central opening for receiving work on said support, a saw frame U-shaped in form adapted to straddle said opening, a saw blade carried by said saw frame and extending transversely across said opening, and coolant supply means comprising nozzles mounted on said main frame at opposite sides of said opening and adapted to direct coolant downwardly and inwardly toward the central portion of the saw blade.

12. A power driven hack saw having, in combination, a work support, a main frame mounted for movement toward and from the work support, said main frame having a lower central opening adapted to receive the work, a saw frame having end portions on opposite sides of said opening and a yoke portion connecting the end portions above the opening, said main frame being constructed to form a housing enclosing said saw frame, means for slidably supporting the saw frame in the housing, a saw blade secured to the lower ends of said end portions within said housing, the latter having openings therein for the passage of said blade, means for reciprocating the saw frame, and coolant supply means comprising a nozzle mounted in said housing at one side of said opening and adapted to discharge downwardly onto said blade.

13. A power driven hack saw having, in combination, a work support, a main frame mounted for movement toward and from the work support, said main frame having a lower central opening adapted to receive the work, a saw frame having end portions on opposite sides of said opening and a yoke portion connecting the end portions above the opening, a saw blade secured to the lower ends of said end portions within said housing, means for reciprocating the saw frame, means for imparting a combined reciprocatory and rocking motion to the blade operative in the cutting stroke of the blade to move successive teeth into and out of engagement with the work progressively, and coolant supply means comprising nozzles mounted on said main frame at opposite sides of said opening and adapted to direct jets of coolant downwardly toward the central portion of the blade.

14. A power driven hack saw comprising, in combination, a work support, a carriage mounted for vertical movement and constructed to form a housing having a lower central opening for receiving work on said support, a U-shaped saw frame enclosed within said housing between said side walls thereof and having end portions on opposite sides of said opening and a yoke portion connecting the end portions and disposed above said opening, a track member pivotally supported in said housing above said opening, guide elements on said frame coacting with said track member, means for reciprocating the frame relative to said track member, and means for swinging the track member in the reciprocation of the frame.

15. A power driven hack saw comprising, in combination, a work support, a carrier having a saw blade extending transversely of the work on said support, a track of a length greater than said carrier and pivotally supported at one end and inclined toward the work, means on said carrier coacting with said track to guide the carrier for endwise bodily movement, and means coacting with said track at the end thereof opposite its pivotal support and operative to impart a lifting movement to the forward end of the carrier during the cutting stroke of the blade.

16. A power driven hack saw having, in combination, a work support, a carriage mounted for feeding movement toward said work support, a saw frame mounted on said carriage for bodily reciprocation, said carriage having a lower central opening for receiving the work, and said frame having a saw blade extending transversely across said opening, and power driven mechanism for reciprocating the frame, said power driven mechanism including an actuating element mounted on said carriage and operatively associated with said frame to impart a rocking motion thereto during the cutting stroke of the blade.

17. A power driven hack saw comprising, in combination, a work support, a carriage mounted for feeding movement downwardly toward said work support, a saw blade carrier, a track pivotally mounted on said carriage, means on said carrier coacting with said track for guiding the carrier relative to said carriage and the work on said support, and means on said carriage coacting with the end of said track opposite its pivotal support and operative to raise the track in the movement of the carrier during the cutting stroke of the blade, said track being inclined to move the carrier gradually toward the work, and said raising means being operative during the cutting stroke to lessen gradually the degree of inclination of the track.

18. In a hack saw, the combination of a work support, a saw frame, a power driven actuator for said frame, and means for supporting and guiding the frame for endwise reciprocation by said actuator, said means comprising an elongated guide member inclined relative to the saw blade, and cam means operative on said guide member during the cutting stroke of the blade to decrease gradually the degree of inclination of the guide member relative to the position occupied by the blade at the beginning of the cutting stroke and operative during the return stroke to return the guide member to its original position.

19. A power driven hack saw comprising, in combination, a stationary work support, a main frame mounted for movement toward and from said work support, a saw blade carrier, a power driven actuator for said carrier, and means for supporting and guiding the carrier for bodily movement longitudinally of the carriage, said means comprising an elongated track member pivotally mounted at one end on said carriage and a cam coacting with the other end of said member to govern the angular relation of said member and the saw blade to said support, said carrier having guide means engaging with the track member between its fulcrum point and said cam.

20. A power driven hack saw having, in combination, a work support, a blade supporting carrier, a power driven actuator for the carrier, and means for supporting and guiding the carrier for endwise bodily reciprocation by said actuator, said means including an elongated guide member mounted for movement toward and from the work and a controlling cam for the guide member, the guide member being inclined relative to the saw blade and being controlled by said cam to impart to the blade during the cutting stroke thereof a bodily movement toward the work to carry successive portions of the cutting edge gradually into cutting engagement with the work, and said cam being further operative after the initial portion of the cutting stroke to impart a gradual movement to the forward end of the saw blade in a direction away from the work.

21. A power driven hack saw having, in combination, a work support, a blade supporting carrier, a power driven actuator for the carrier, and means for supporting and guiding the carrier for endwise reciprocation by said actuator, said means being operative during the cutting stroke of the blade to impart thereto a bodily movement toward the work to carry successive portions of the cutting edge gradually into cutting engagement with the work, and said means further acting after the initial cutting portion of the cutting stroke to impart to the forward end of the blade a gradual movement in a direction away from the work.

22. In a power driven hack saw, a carriage mounted for reciprocal movement relative to a work holder, a saw blade carrier, inclined track means pivotally mounted upon the carriage for supporting and guiding said carrier for reciprocation in a generally forward and downward direction in the cutting stroke, and cam means mounted on said carriage adjacent to the forward end of said carriage for controlling the degree of inclination of said track means.

23. A power saw of the character described comprising, in combination, a support for a work piece, an upright supporting means located on opposite sides of said support, a carriage mounted upon said supporting means for movement toward and away from said support and having an opening for receiving the work piece, a saw frame supported by said carriage and carrying a saw blade traversing said opening to engage the work piece, means mounted on said carriage for actuating said frame to move said blade through a cutting stroke, means operable in concert with said actuating means for feeding said carriage gradually toward the work piece to maintain said blade in cutting relation thereto, and manually operable means for controlling said last mentioned means to operate independently of said actuating means to shift said carriage toward or away from said work piece.

24. In combination in a power driven hack saw construction of the character described, a work support, a saw blade and means for supporting the same, actuating means for moving said blade with a roll-stroke action wherein successive teeth along the cutting edge of said blade are progressively active from the forward end to the rear end of said blade progressively during each cutting stroke, the cutting edge of said blade having a convex curvature whereby the cut surface of the work piece will be substantially straight.

25. A hack saw machine comprising, in combination, a work holder, a saw blade and a saw frame adapted to be reciprocated to move the blade in cutting and return strokes, a carriage for said saw frame supported for saw-feeding and retracting movements relative to said work holder and having means for guiding the saw frame with a generally rocking motion coincident with the cutting stroke to carry successive teeth of said blade into and out of cutting relation with a work piece in said holder progressively from front to rear along the cut, and means for reciprocating said saw frame, said guiding means being operative at the end of the cutting stroke to raise the saw frame relative to said carriage and lift said blade out of contact with the work piece and to maintain the frame raised during the return stroke so that the blade will not drag across the work.

26. A hack saw machine comprising, in combination, a holder for a work piece to be cut, a saw frame and blade, a carriage including a housing for entirely enclosing said frame and having a work-receiving opening straddled by said frame and traversed by said blade, means for supporting said carriage and work holder for relative movement toward and from one another, and means for reciprocating said frame within said housing to actuate said blade in a cutting stroke, said blade being the only moving part at any time projecting into said opening.

27. A power saw of the character described comprising in combination, a work holder, a carriage mounted over said work holder, a saw frame supported by said carriage for reciprocation relative to said work support and having spaced depending legs to receive a saw blade therebetween for cutting a work piece in said work holder, means for relatively moving said carriage and said work holder to maintain the saw in cutting relation to the work piece as the cutting proceeds, a part of said carriage extending between the saw frame legs, and means on said part for directing coolant and flushing fluid to the line of cutting.

28. A hack saw machine comprising, in combination, a base, spaced upright posts supported by said base, a work holder between said posts, a carriage of substantial bulk guided for vertical movement on said posts, a saw frame supported by said carriage for cutting movement and having a saw blade to cut work in said holder, means supported entirely by said carriage for actuating said saw frame, means also supported by said carriage for effecting raising movement thereof, and a prime mover on said carriage for operating said saw frame actuating means and said carriage raising means.

29. A power hack saw comprising, in combination, a base including a work holder, a pair of members movable on a common radius on opposite sides of said work holder, a post rising from each of said members, a carriage extending between and movable up and down on said posts, a saw frame reciprocably supported by said carriage and adapted for guiding a saw blade in a cutting stroke across a work piece in said holder, and means on said carriage for actuating said frame, said carriage being shiftable by moving said members on said radius to adjust the angle at which the saw blade will cut across the work.

30. A power hack saw comprising, in combination, a base, a pair of spaced posts rising from said base, a carriage engaging said posts at its opposite ends and having a saw frame movable to actuate a saw blade in a cutting stroke, and means at the top of the carriage coacting with the tops of said posts for controlling the vertical position of the carriage and thereby the position of the saw blade relative to a work piece to be cut.

31. A hack saw machine comprising, in combination, a base, a work support, means rising rigidly upwardly from said base and including a member having a cylindrical upper end portion, a carriage, means rigid with said carriage including an elongated hollow member providing a substantially fluid tight chamber to receive said cylindrical portion slidably and adapted to contain pressure fluid to act upon said cylindrical portion to force said carriage upwardly therealong, a saw supported by said carriage above said work support, and means for withdrawing pressure fluid from said chamber to lower said carriage and said saw toward said work support.

32. A hack saw machine comprising, in combination, a base, a work support, upright supporting means rising from said base, a carriage mounted upon said upright suporting means and movable vertically thereon, a saw frame carried for reciprocal movement relative to said carriage and having a saw blade adapted to cut work upon said work support, means supported by said carriage for actuating said saw frame, a prime mover mounted upon said carriage and operatively connected with said actuating means, pressure fluid operated means for effecting vertical movement of said carriage, and means operating in concert with said actuating means for governing said pressure fluid operated means to control the descent of said carriage by predetermined increments.

33. A hack saw machine comprising, in combination, a carriage mounted for vertical movement, a saw frame supported by said carriage for reciprocal movement relative thereto, means for reciprocating said saw frame including a drive shaft supported by said carriage, and means driven by said shaft for rocking said saw frame for roll stroke operation during the reciprocations thereof.

34. A hack saw machine comprising, in combination, base means, spaced upright posts supported by said base means, a work holder carried by said base means, a carriage guided for vertical movement on said posts, a saw frame supported by said carriage for reciprocal cutting movement and adapted to have a saw blade mounted therein to cut work in said holder, means supported by said carriage for reciprocating said saw frame in cutting and return strokes, means on the carriage cooperative with at least one of said posts for effecting raising movement of said carriage and operative to permit lowering of the carriage during each cutting stroke of said saw frame, and a prime mover on said carriage for operating said saw frame reciprocating means and said carriage raising means.

35. A hack saw machine, comprising, in combination, base means, spaced upright posts supported by said base means, a work holder carried by said base means, a carriage guided for vertical movement on said posts, a saw frame supported by said carriage for reciprocal cutting movement and adapted to have a saw blade mounted therein to cut work in said holder, means supported by said carriage for reciprocating said saw frame in cutting and return strokes, a cam member arranged to be driven in concert with said reciprocating means, means controlled by said cam member for effecting raising and lowering movements of said saw frame at respectively the ends of the cutting and return strokes, and a prime mover on said carriage for driving said saw frame actuating means and said cam member.

36. A hack saw machine comprising, in combination, base means, spaced upright posts supported by said base means, a work holder carried by said base means, a carriage guided by said posts for vertical movement, a saw frame supported by said carriage for reciprocation in cutting and return strokes and adapted to have a saw blade mounted therein to cut work in said holder, means supported by said carriage for reciprocating said saw frame, means for effecting raising and lowering movements of the carriage, a prime mover on said carriage for operating said saw frame reciprocating means and for motivating said raising and lowering means, and means for adjustably controlling the force with which the carriage and associated parts may carry the saw blade against the work during a cutting stroke.

37. A hack saw machine comprising, in combination, base means, spaced upright posts supported by said base means, a work holder on said base means, a carriage guided by said posts for vertical movement, a saw frame supported by said carriage for reciprocation in cutting and return strokes and adapted to have a saw blade mounted therein to cut work in said holder, means on said carriage for actuating said saw frame including a rotary driving member, a prime mover on said carriage for rotating said driving member, and means actuated in the rotation of said rotary driving member for effecting vertical movement of said carriage.

GEORGE J. BLUM.